Aug. 21, 1923.  1,465,826
R. C. KING
RETREADING MACHINE
Filed Jan. 26, 1922
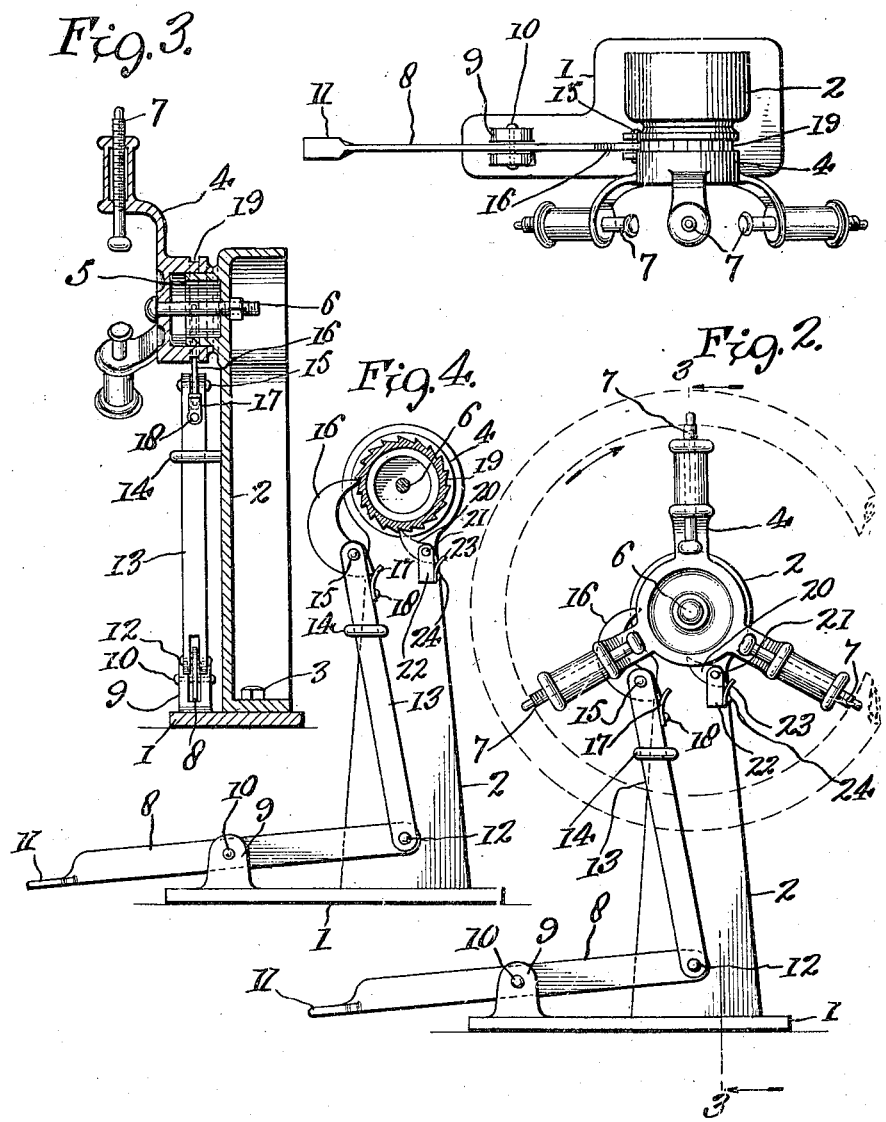
Witness
INVENTOR.
Robert C. King.
BY
ATTORNEY Patented Aug. 21, 1923.

1,465,826

UNITED STATES PATENT OFFICE.

ROBERT CALVIN KING, OF EL PASO, TEXAS.

RETREADING MACHINE.

Application filed January 26, 1922. Serial No. 531,946.

*To all whom it may concern:*

Be it known that I, ROBERT CALVIN KING, a citizen of the United States of America, residing at El Paso, Texas, have invented certain new and useful Improvements in Retreading Machines; and I do hereby declare the following to be a full, clear, and exact description of the invention, such as will enable others skilled in the art to which it appertains to make and use the same.

The present invention relates to improvements in re-treading machines for rubber tires and it has for an object to provide for the rotary movement of the tire by foot whereby to leave the hands of the operator free for attention to the tire and the tread stock.

With existing tire rims or stands, unevenness often results because of the inability of the operator at all times to employ both hands to guide and center the tread stock and this lack of uniformity in the placing of the stock upon the tire carcass results in imperfections in the tire which depreciate the commercial value thereof. Moreover, unless both hands are free soap stone or other injurious substances from the side walls of the tire are apt to get upon the tread stock. It is the object of the invention therefore to leave both hands of the operator free throughout the entire retreading operation and to provide for the rotation of the tire by foot. Other objects of the invention are to simplify and strengthen machines of this character and to provide a similar foot operating mechanism which will exert considerable power in the turning of the tire and which will furthermore hold the tire in the newly adjustable position.

I attain these objects by the mechanism shown in the accompanying drawing in which Fig. 1 is a plan view looking down on top of the machine with adjusting pins removed. Fig. 2 is a front elevation of the whole machine. Fig. 3 is a section on dotted line (3) in Fig. 2 with adjusting rods removed. Fig. 4 is a front elevation with shroud and arms of head removed showing lever, connecting rod, pawls and ratchet hereinafter referred to. Similar numerals refer to similar parts throughout the several views.

The base (1) to which is fastened pedestal (2) by stud bolts (3) constitute the frame or stationary part of the stand.

The head (4) is chambered and rests on boss (5) forming a bearing upon which it rotates. The head (4) is held in place by a bolt (6) passing through the head (4) and pedestal (2). The threaded rods (7) are adjustable and hold securely a tire rim and tube (not shown in drawing).

I carry out my idea of rotation (4) by means of a lever (8) passing through a slotted bracket (9) the fulcrum of said lever (8) is supported by a pin (10) passing through bracket (9) and lever (8).

The long or out end of lever (8) is fitted with a foot piece (11). The short or in end of lever (8) is attached by pin (12) to the bottom end of connecting rod (13). The connecting rod (13) passes through a guide bracket (14) cast on pedestal (2), said bracket (14) forming a guide for connecting rod (13). Attached to upper end of connecting rod (13) by a pin (15) is a pawl (16). A spring (17) fastened to connecting rod (13) by a rivet (18) holds pawl (16) in contact with ratchet (19). Ratchet (19) is cast on and is one part of head (4). Pawl (20) fastened by rivet (21) to bracket (22) and held in contact with ratchet (19) by spring (23) prevents head (4) from rotating in opposite direction when force on pawl (16) is released and said pawl (16) is descending. (24) is a rivet fastening spring (23) to bracket (22).

The operator may with one foot depress the out end of the lever (8) thereby applying the force which, acting in conjunction with connecting rod (13), pawl (16) and ratchet (19) rotates head (4) from time to time as desired, a small distance each time.

I claim:

A re-treading machine comprising a pedestal, a base supporting the pedestal, said pedestal having a laterally projecting substantially cylindrical boss, a head rotating about the boss and provided with ratchet teeth, a pivot bolt securing said head to said pedestal and confining the head upon the boss, adjustable tire carrying means on said head, a treadle lever pivoted upon said base, a connecting rod coupled to said treadle and extending upwardly and slidable along said pedestal, spring pressed means carried by said connecting rod and engaging with said ratchet teeth, and means also yieldably engaging with said ratchet teeth for holding the head against retrograde movement.

In testimony whereof I affix my signature at El Paso, Texas, this 9th day of January, A. D. 1922.

ROBERT CALVIN KING.